W. H. SPENCER.
DISPLAY LIGHTING APPARATUS.
APPLICATION FILED JUNE 3, 1914.
1,124,544.
Patented Jan. 12, 1915.
3 SHEETS—SHEET 1.
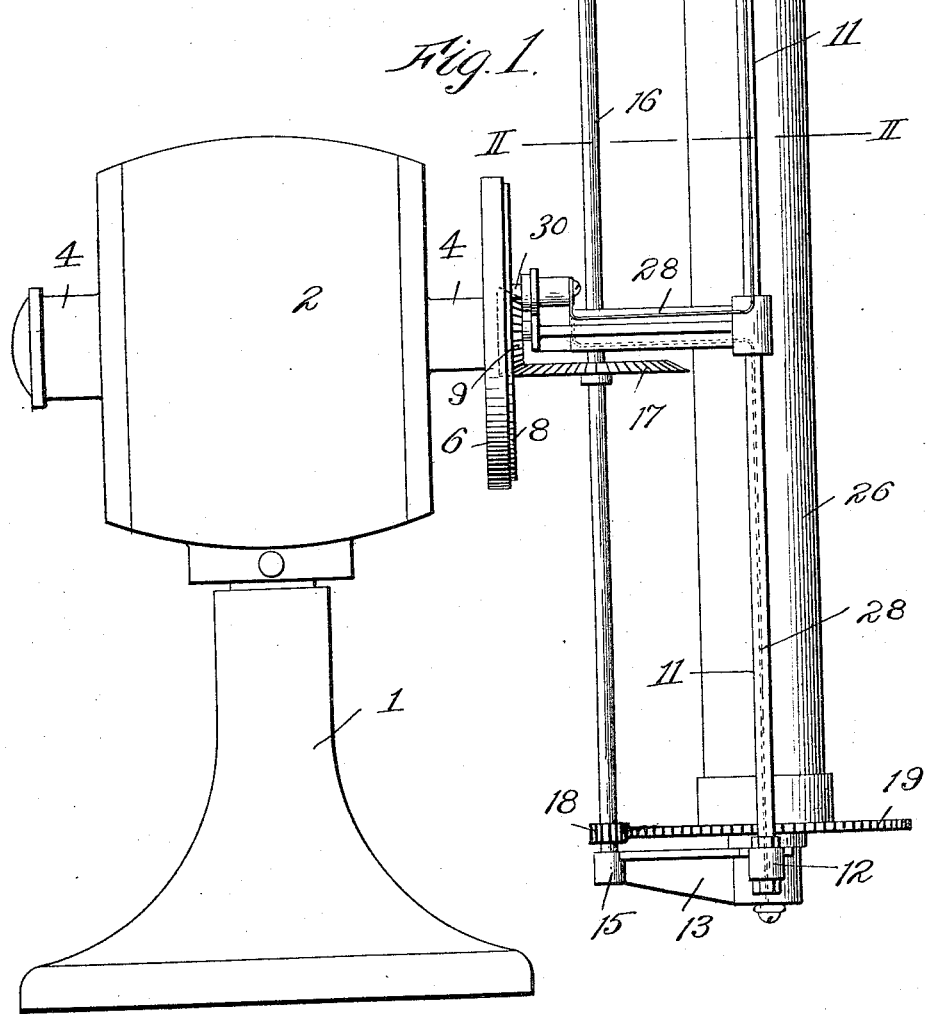

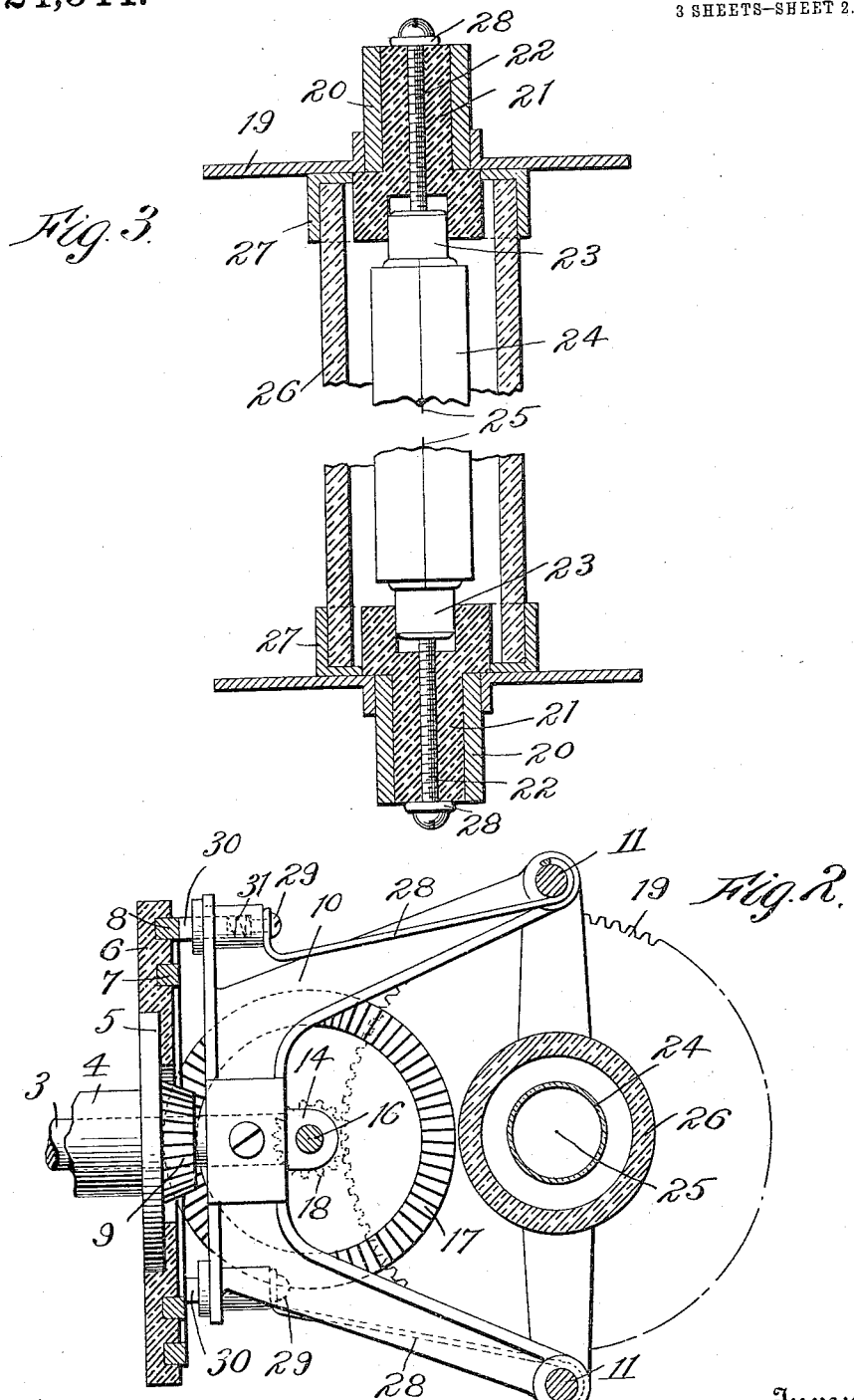

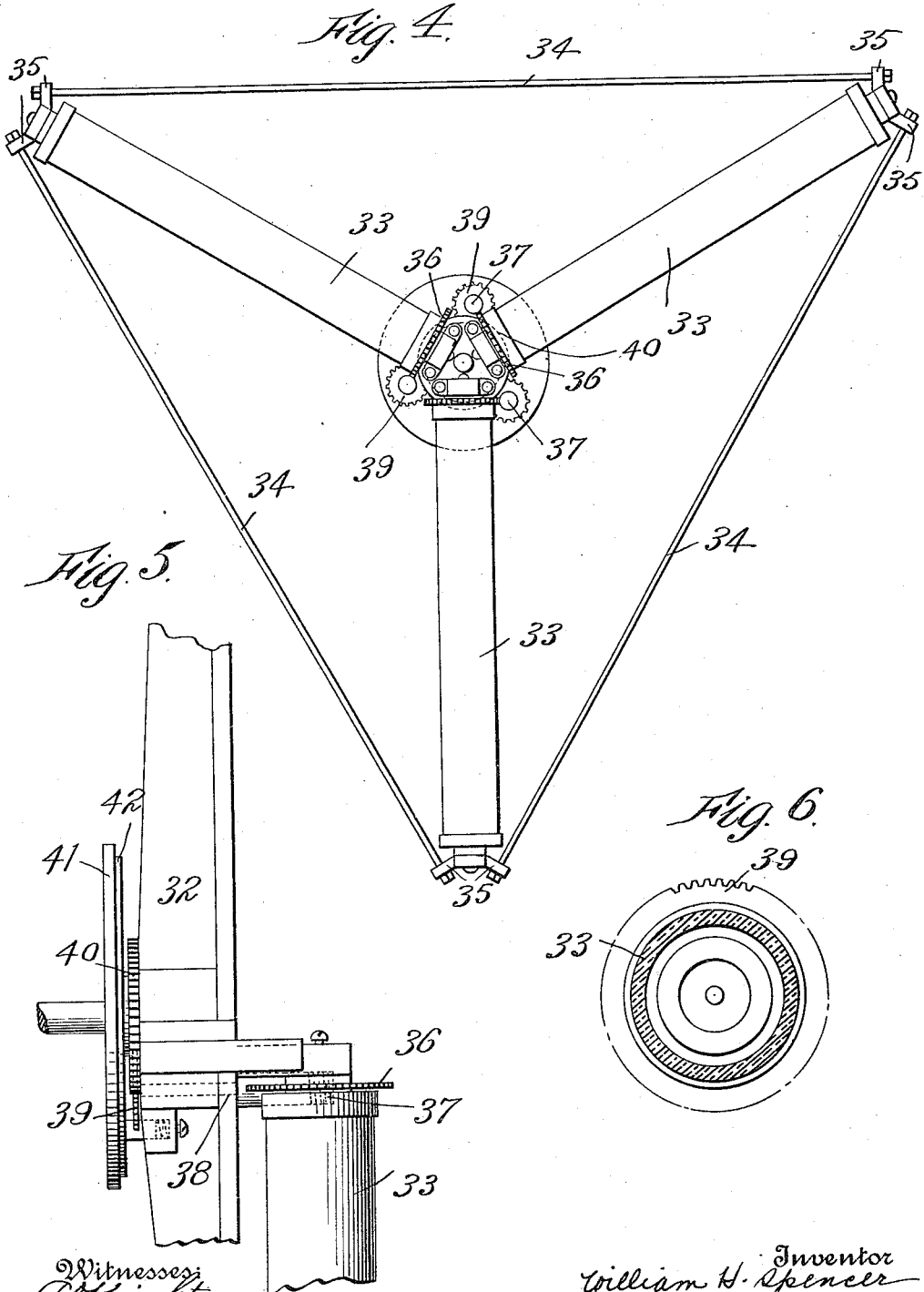

UNITED STATES PATENT OFFICE.

WILLIAM H. SPENCER, OF NEW YORK, N. Y., ASSIGNOR TO GEORGE FRINK SPENCER, OF NEW YORK, N. Y.

DISPLAY LIGHTING APPARATUS.

1,124,544. Specification of Letters Patent. Patented Jan. 12, 1915.

Application filed June 3, 1914. Serial No. 842,801.

*To all whom it may concern:*

Be it known that I, WILLIAM H. SPENCER, a citizen of the United States, and a resident of the borough of Manhattan, city, county, and State of New York, have invented certain new and useful Improvements in Display Lighting Apparatus, of which the following is a full and clear specification.

This invention relates to a display lighting apparatus which, on account of the similarity of its effects to a variable spectrum, I have called a "spectro light."

This invention has for its general object to provide apparatus of this character which will display different colors in succession, intermingle said colors, change from one color to another, and vary the shading effects during such change.

More especially, my invention contemplates apparatus of this nature in which a transparent tube has a plurality of color patches arranged thereon and is suitably mounted to rotate on its own axis while being revolved about another axis non-coincident therewith. Preferably, said tube is mounted on a rotary shaft by means of suitable bearings which support the tube at right angles to said shaft and permit it to be rotated by geared connections between said tube and a fixed gear coaxial with the rotary shaft.

In the drawings which exemplify my invention in its adaptation to an electrically operated "spectrolight,"—Figure 1 is a side elevation of one embodiment of my invention; Fig. 2 is a fragmentary section on the line II—II, Fig. 1; Fig. 3 is an axial section on an enlarged scale, of the glass cylinder which carries the color patches, parts being broken away and parts shown in section; Fig. 4 is a top plan view of another embodiment of my invention; Fig. 5 is a fragmentary side elevation on an enlarged scale of one end of one of the tubes of this embodiment showing certain operating connections; Fig. 6 is a transverse section of one of the tubes, which section may correspond to either embodiment; and Fig. 7 is a fragmentary development of a portion of one of the cylinders.

In the embodiments shown in Figs. 1, 2 and 3, a pedestal 1 serves to mount the housing 2 of a motor of any suitable description, which constitutes the preferred means for driving a rotary shaft 3 which is journaled within suitable bearings 4. The forwardly presented bearing 4, as shown best in Fig. 2 is provided with a disk 5 which carries a circular plate 6. Partly embedded in the plate 6 are contact rings 7 and 8, one being positive and the other negative. Rigid with the disk 5 is a bevel gear 9. Secured to the outer end of the shaft 3 is a bifurcated bracket 10 within the arms of which are secured tie rods 11, said tie rods being secured at their ends to the lateral arms 12 of end brackets 13. The bracket 10 is provided with a centrally disposed lug 14 having a bearing in alinement with similar bearings 15 in the end brackets 13. Journaled within the lug 14 and bearings 15, is a rotary shaft 16 having keyed thereto a bevel gear 17 which meshes with the bevel gear 9 on the disk 5. Keyed to the rod 16 adjacent to the outer ends thereof, are pinions 18 which mesh with spur gears 19, said gears 19 being rigidly mounted upon sleeves 20, as shown in Fig. 3. Sleeves 20 carry sockets 21 of any suitable construction for mounting electrodes 22 which in the present embodiment are in the form of screws threaded in the sockets 21 in suitable conducting relation to the electrodes embedded in the elongated filament lamp 24 containing filament 25. This lamp constitutes a source of light within the transparent cylinder 26 which is interposed between the annular cups 27 which are rigid with the gears 19 respectively. The cylinder 26 is made of suitable length to determine the proper spacing between the gears 19. To the outer end of each screw 22 is secured a wire 28, said wires being wound upon the rods 11 respectively as shown in Fig. 1, and as shown in Fig. 2 secured to the binding posts 29 within which are socketed the contact brushes 30 which are resiliently mounted in the center bracket 10 by means of springs 31. The said brushes 30 are therefore resiliently pressed against the contact rings 7 and 8 and serve to establish an electric circuit including brushes 7 and 8, contacts 30, wires 28, screws 22 and filament 25.

It will be seen from the foregoing description that as the shaft 3 is rotated, the center bracket 10 will be caused to rotate together with the rods 11 and end brackets 13, thus causing the cylinder 26 to be rotated about the axes of the shaft 3. Simultaneously with this movement, the gear 17 will be rotated by its travel around the periphery of the fixed gear 9, thus imparting a rotary movement to the shaft 16 which transmits its rotary movement by means of gears 18, 19 to the cylinder 26 which is thus caused to rotate upon its own axis while revolving about the axis of shaft 3.

In the embodiment shown in Figs. 4 and 5, substantially the same principle of construction and operation is involved. In this embodiment, a spider or frame 32 is provided for mounting a plurality of the transparent cylinders 33. The radially disposed arms of the spider frame 32 are reinforced by tie rods 34, the ends of said tie rods being secured in suitable lugs 35 provided on the outer ends of the arms of spider 32. Each of the cylinders 33 is of substantially similar construction to that shown in Fig. 3, each being provided with a gear 36 on its inner end, which meshes with a worm 37 carried on one end of a spindle 38 (see Fig. 5). The other end of each of the spindles 38 carries a small spur gear 39 which meshes with a fixed gear 40 which is rigidly connected to the disk 41, said disk 41 being provided with the contact rings 42 (only one of which is shown), which are of positive and negative polarity respectively for providing current for the lamps 33. In the embodiments of my invention shown in the drawings, the cylinders 26 and 33 are provided with color patches which may be arranged in any desired order or conformation. An example of the same is shown in Fig. 7 representing color bands extending longitudinally and peripherally of said cylinders, and each of said bands comprising patches of different colors, such for example as the primary colors represented by the letters $v$, $i$, $b$, $g$, $y$, $o$, $r$. It will be seen therefore that as the tubes 26 and 33 are revolved while at the same time rotating on their axes, the illuminated color patches which are presented to view to a person standing immediately in front of the apparatus, will give the effect of continuous illuminated bands of different colors concentrically formed with respect to the shaft 3. As the cylinders 26 and 33 are rotated on their axes at relatively slow speed, the colors of these bands will change gradually in shade depending upon which illuminated patches are presented forwardly and the relative amounts of adjacently disposed patches which may be presented to view at the same time. The device thus serves as a color mixing apparatus by means of which various color effects can be obtained by forethought in the arrangement of the color patches indicated in Fig. 7. The rectangular form of the color patches shown in Fig. 7 is merely illustrative of the purpose to which my improved apparatus may be adapted. Obviously, various modifications may be embodied without departing from the broad spirit of my invention.

I claim:

1. In a machine of the character described, a member rotatable about an axis, said member being provided with patches of different colors which are adapted to be successively presented to view by the rotation of said member, and means for revolving said member about another axis, said member being presented to view in a direction normal to the plane of movement about the second mentioned axis to produce the appearance of a continuous band of color corresponding to the path of movement of said patch of color around the second mentioned axis.

2. In a machine of the character described, a member rotatable about an axis, said member being provided with patches of different colors which are adapted to be successively presented to view by the rotation of said member, and means for revolving said member about another axis, said member being presented to view in a direction normal to the plane of movement about the second mentioned axis to produce the appearance of a continuous band of color corresponding to the path of movement of said patch of color around the second mentioned axis, said axes intersecting in a point.

3. In a machine of the character described, a member rotatable about an axis, said member being provided with patches of different colors which are adapted to be successively presented to view by the rotation of said member, and means for revolving said member about another axis, said member being presented to view in a direction normal to the plane of movement about the second mentioned axis to produce the appearance of a continuous band of color corresponding to the path of movement of said patch of color around the second mentioned axis, said member having cylindrical bands, each of said bands comprising color patches which are successively presented to view by the rotation of said member on the axis of said bands.

4. In a machine of the character described, a member rotatable about an axis, said member being provided with patches of different colors which are adapted to be successively presented to view by the rotation of said member, and means for revolving said member about another axis to produce the appearance of a continuous band of color corresponding to the path of movement of said patch of color around the second mentioned axis, said member having cylindrical bands, each of said bands comprising color patches which are successively presented to view by the rotation of said member on the axis of said bands, the second mentioned axis intersecting the first mentioned axis midway of the length of said member, said color bands at equal distances from the second mentioned axis being constituted by the same colors similarly arranged with respect to their periods of presentation to view.

5. In a machine of the character described, the combination with a plurality of color patches, of means for successively presenting said color patches to view, and means for revolving the color patch in view in a plane to produce the effect of a circular band of the same color.

6. In a machine of the character described, the combination with a plurality of color patches, of means for successively presenting said color patches to view, and means for revolving the color patch in view in a plane to produce the effect of a circular band of the same color, said presenting means being adapted to gradually reduce the extent of one color patch which is presented to view in said plane of movement while gradually increasing the extent of the succeeding patch which is being presented.

7. In a machine of the character described, a cylinder rotatable on its axis, means for revolving said cylinder about another axis while it is rotating on its own axis, said cylinder being presented lengthwise to view and a plurality of color patches arranged in a band extending around the cylinder.

8. In a device of the character described, the combination of a cylinder rotatable on its axis and rotatable about another axis transverse thereto, said cylinder being presented lengthwise to view and bands of colors extending longitudinally of said cylinder and peripherally thereof, one of said bands comprising a plurality of color patches.

9. In a device of the character described, the combination of a cylinder rotatable on its axis and rotatable about another axis transverse thereto, said cylinder being presented lengthwise to view, and bands of colors extending longitudinally of said cylinder and peripherally thereof, each of said bands comprising a plurality of color patches.

10. In a machine of the character described, a member provided with a plurality of cylindrical bands each comprising patches of different colors, said member being rotatable about the common axis of said bands and suitably mounted to revolve about a second axis transverse thereto, said member being presented to view in a direction normal to the plane of rotation of said member about said second axis.

11. In a device of the character described, the combination of a rotary shaft, a transparent tube mounted thereon, the axis of said shaft intercepting the axis of said tube substantially midway of the latter's length, patches of color carried by said tube, a fixed gear coaxially arranged with respect to the axis of said rotary shaft, a rotary shaft parallel to the axis of said tube and having geared connections with said fixed gear, geared connections between the ends of the last mentioned shaft and said tube, and a source of light arranged within said tube.

12. In a device of the character described, the combination of a rotary shaft, a transparent tube mounted thereon, the axis of said shaft intercepting the axis of said tube substantially midway of the latter's length, patches of color carried by said tube, a member relatively to which said rotary shaft rotates, means connecting said member to said tube for transmitting a relatively slow rotary movement to said tube by the rotary movement of said shaft, and a source of light arranged within said tube.

13. In a device of the character described, the combination of a rotary shaft, a transparent tube mounted thereon, the axis of said shaft intercepting the axis of said tube substantially midway of the latter's length, patches of color carried by said tube, a member relatively to which said rotary shaft rotates, means connecting said member to said tube for transmitting a relatively slow rotary movement to said tube by the rotary movement of said shaft, and a source of light arranged within said tube, said tube being provided with electrodes at opposite ends and an elongated filament lamp suspended between said electrodes, and wiring connections for said electrodes.

14. In a device of the character described, the combination of a rotary shaft, a fixed plate coaxial therewith and having positive and negative contact rings, a transparent tube extending transversely of said rotary shaft, said tube being provided with patches of different colors, means for supporting said tube from said rotary shaft, said means being adapted to permit said tube to rotate on its own axis, means for imparting a rotary movement to said tube on its own axis, positive and negative electrodes arranged adjacent opposite ends of said tube, an elongated filament lamp mounted between said electrodes, contacts carried by said rotary shaft, said contacts being in engagement with said contact rings, and electrical connections between said contacts and said electrodes.

WILLIAM H. SPENCER.

Witnesses:
 GEO. T. INGALLS,
 ALEX. C. MATTISON.

Copies of this patent may be obtained for five cents each, by addressing the "Commissioner of Patents, Washington, D. C."